United States Patent
Kinefuchi et al.

(10) Patent No.: US 9,339,887 B2
(45) Date of Patent: May 17, 2016

(54) METHOD FOR BONDING DISSIMILAR METALS TO EACH OTHER

(75) Inventors: Masao Kinefuchi, Kobe (JP); Yasuo Murai, Fujisawa (JP); Noritaka Eguchi, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 379 days.

(21) Appl. No.: 14/003,363

(22) PCT Filed: Feb. 29, 2012

(86) PCT No.: PCT/JP2012/055143
§ 371 (c)(1),
(2), (4) Date: Sep. 5, 2013

(87) PCT Pub. No.: WO2012/121086
PCT Pub. Date: Sep. 13, 2012

(65) Prior Publication Data
US 2013/0341306 A1    Dec. 26, 2013

(30) Foreign Application Priority Data

| Mar. 7, 2011 | (JP) | 2011-049249 |
| Sep. 27, 2011 | (JP) | 2011-210459 |
| Sep. 27, 2011 | (JP) | 2011-210460 |

(51) Int. Cl.
*B23K 9/02* (2006.01)
*B23K 35/04* (2006.01)
(Continued)

(52) U.S. Cl.
CPC . *B23K 9/16* (2013.01); *B23K 9/025* (2013.01); *B23K 9/167* (2013.01); *B23K 9/232* (2013.01);
(Continued)

(58) Field of Classification Search
CPC ............... B23K 35/002; B23K 35/004; B23K 35/0266; B23K 9/025; B23K 9/16; B23K 9/167; B23K 9/232; B23K 2203/20
See application file for complete search history.

(56) References Cited

U.S. PATENT DOCUMENTS

| 4,532,409 | A | * | 7/1985 | Ogata | B23K 9/167 219/137 R |
| 2008/0206593 | A1 | * | 8/2008 | Fukuda | B23K 9/173 219/74 |

(Continued)

FOREIGN PATENT DOCUMENTS

| JP | 46 23133 | 7/1971 |
| JP | 61-226185 A | * 10/1986 |

(Continued)

OTHER PUBLICATIONS

Written Opinion of the International Searching Authority Issued Jun. 5, 2012 in PCT/JP12/055143 Filed Feb. 29, 2012.
(Continued)

*Primary Examiner* — Geoffrey S Evans
(74) *Attorney, Agent, or Firm* — Oblon, McClelland, Maier & Neustadt, L.L.P.

(57) ABSTRACT

In the bonding of an aluminum alloy material (11) to a steel material (12) by TIG welding, a tungsten electrode (1) which has a tip having a diagonally cut tip face (2) and asymmetrical to the electrode center axis (6) is used. The tungsten electrode (1) is oriented toward the welding line from the upper side of the aluminum alloy material (11) in such a manner that the tip face side of the tungsten electrode (1) faces the aluminum alloy material (11) side and the tip (2*a*) of the tip face (2) faces the steel material (12) side. In this manner, an arc (3) from the tip (2*a*) is directed to the steel material (12) side.

7 Claims, 7 Drawing Sheets

(51) Int. Cl.
*B23K 9/16* (2006.01)
*B23K 9/025* (2006.01)
*B23K 9/167* (2006.01)
*B23K 9/23* (2006.01)
*B23K 35/00* (2006.01)
*B23K 35/02* (2006.01)

(52) U.S. Cl.
CPC ............ *B23K 35/002* (2013.01); *B23K 35/004* (2013.01); *B23K 35/0266* (2013.01); *B23K 2203/20* (2013.01)

(56) References Cited

U.S. PATENT DOCUMENTS

| | | | | |
|---|---|---|---|---|
| 2008/0206594 | A1* | 8/2008 | Fukuda | B23K 9/173 219/74 |
| 2009/0017328 | A1* | 1/2009 | Katoh | B23K 9/173 219/74 |

FOREIGN PATENT DOCUMENTS

| | | | |
|---|---|---|---|
| JP | 6 328287 | | 11/1994 |
| JP | 2000-61642 | A * | 2/2000 |
| JP | 2001 47244 | | 2/2001 |
| JP | 2004 237326 | | 8/2004 |
| JP | 2004-237326 | A * | 8/2004 |
| JP | 2008 68290 | | 3/2008 |
| JP | 2008 105056 | | 5/2008 |
| JP | 2010 201448 | | 9/2010 |
| JP | 2010 207886 | | 9/2010 |
| JP | 2011 36918 | | 2/2011 |

OTHER PUBLICATIONS

International Search Report Issued Jun. 5, 2012 in PCT/JP12/055143 Filed Feb. 29, 2012.

* cited by examiner

METHOD FOR BONDING DISSIMILAR METALS TO EACH OTHER

TECHNICAL FIELD

The present invention relates to a method for bonding dissimilar metals to each other for fillet welding of an aluminum alloy material and a steel material by DC TIG (Tungsten Inert Gas) welding using a tungsten electrode. Also, "an aluminum alloy material" referred to in the present invention is a general term of rolled sheets (cold rolled sheets and the like), extruded shapes made of an aluminum alloy, or various kinds of members and components for a vehicular body and the like obtained by forming them. Further, "a steel material" referred to in the present invention is a general term of cold rolled steels and shape steels, or various kinds of members and components for a vehicular body and the like obtained by forming them.

BACKGROUND ART

In recent years, problems have been raised on global environment such as global warming and the like caused by exhaust gas and the like exhausted from transportation vehicles to begin with automobiles, and, as one of the countermeasures, improvement of the fuel economy by weight reduction of a vehicle such as an automobile has been studied. On the other hand, only with the weight reduction of a vehicle, there is a fear that the possibility of a collision accident of an automobile and the like to become a big accident increases. Therefore, in addition to weight reduction, improvement of safety has also been studied. Due to such reasons, application of an aluminum alloy light in weight and excellent in energy absorption to a part of a vehicular body of a transportation vehicle to begin with an automobile has been studied, and such the aluminum alloy has reached also to practical use in recent years.

However, in order to apply an aluminum alloy to a transportation vehicle to begin with an automobile, it is necessary to execute structural design utilizing the properties of an aluminum alloy. Therefore, with the exception of special vehicles of completely made of an aluminum alloy, an aluminum alloy material is partially incorporated into a steel material that constitutes a structural body of a vehicular body. Accordingly, a dissimilar metals bonding technique of a steel material and an aluminum alloy material becomes indispensable.

However, when dissimilar metals bonding of a steel material and an aluminum alloy material is to be executed only by welding, an intermetallic compound layer (or a reaction layer) of Fe and Al highly hard and highly brittle is formed in the bonding interface of the steel material and the aluminum alloy material. That is, such a problem occurs that, even when the steel material and the aluminum alloy material appear to be bonded to each other, sufficient bonding strength cannot be secured in the joint due to the highly brittle intermetallic compound layer (or the reaction layer) of Fe and Al formed in the bonding interface.

When welding is employed for the bonding technique of a steel material and an aluminum alloy, such a problem as described above occurs. Therefore, for bonding of a steel material and an aluminum alloy material, mechanical bonding techniques using fixtures such as self pierce rivets, bolts and the like and bonding techniques using adhesives have been employed. However, these bonding techniques have the problems of complicated bonding work and increase of bonding cost, and have not been applied widely.

Currently, for bonding of a steel material and the like which constitute a transportation vehicle to begin with an automobile, welding techniques such as linear bonding such as TIG welding and the like and spot bonding and the like are generally used. When these welding techniques can be applied to the dissimilar metals bonding technique of a steel material and an aluminum alloy, a vehicle using an aluminum alloy can be manufactured in a line and process same to those for the steel material in a factory, and efficiency of the bonding work can be further enhanced.

Among these welding techniques, TIG welding is a technique employed most widely for bonding of steel materials to each other and the like. However, as described above, there is a fear of a problem of formation of an intermetallic compound layer of Fe and Al in dissimilar metals bonding of a steel material and an aluminum alloy material, and therefore the fact is that not only TIG welding has not been put in practical use but also it has not been proposed.

Under such situation, in Patent Literature 1, a technique on dissimilar metals bonding for a steel material and an aluminum alloy material by TIG welding has been proposed. However, in this proposal, TIG welding has been just cited as an example of butt welding and lap welding. More specifically, in this proposal, the welding means is selected from a group consisting of a laser, electron beam, plasma arc, TIG, MIG, and $CO_2$ arc. In this proposal, it is only mentioned that a welding means can be TIG welding.

In Patent Literature 2, a dissimilar metals bonding method has been proposed in which a steel material and an aluminum alloy material are welded so as to be lapped each other with the steel material being laid in the upper side and the aluminum alloy material in the lower side relative to the welding operation direction. In this method, it has been proposed to execute welding along the welding line in a state the position of the welding surface of the aluminum alloy material is projected to the upper side of the position of the welding surface of the steel material relative to the welding operation direction. It has been described that, according to this method, the wettability of the welding surface of the steel material against the aluminum molten metal is improved, removal of an oxide film on the surface (welding surface) of the steel material is promoted, and excellent bonding can be achieved.

Also, in this Patent Literature 2, TIG welding of a form using a flux-cored wire (FCW) that is obtained by filling flux inside an outer sheath of an aluminum material is also intended. In the meantime, a number of compositions of FCW used for such dissimilar metals bonding have been proposed from the past in Patent Literature 3 and the like. However, even in these Patent Literatures 2, 3, a concrete dissimilar metals bonding method of an aluminum alloy material and a steel material using TIG welding has not been disclosed.

Therefore, the present inventors newly executed an actual dissimilar metals bonding test for bonding an aluminum alloy material and a steel material by TIG welding, and confirmed the problems occurring then. More specifically, as shown in FIG. 10, first, one end of an aluminum alloy material 11 was overlaid on top of a steel material 12 with the aluminum alloy material 11 being placed on the upper side. Also, while feeding a flux-cored wire (FCW) 7 to a step section 13 formed by an end 11a of the aluminum alloy material 11 and the surface of the steel material 12, the dissimilar metals bonding test was executed for fillet welding of the aluminum alloy material 11 and the steel material 12 using a tungsten electrode 30. Further, TIG welding was executed by AC TIG welding that was generally used for welding of aluminum alloy materials to each other.

As a result of this dissimilar metals bonding test, although the spatter scarcely occurred in welding which was excellent, the molten aluminum alloy material 11 and the FCW 7 that was molten similarly became a bonding (bead) of being present separately as beads 4a, 4b on the surface of the steel material 12.

Such bonding state of separation into the beads 4a, 4b occurred even when adjustment of largely changing the welding condition of TIG welding such as increasing the power (heat input), reducing the welding speed and the like was executed, and could not be entirely prevented. In such bonding state of the separate bead, the bonding strength of the joint (dissimilar metals bonding joint) cannot be increased.

Also, this separation of the bead is liable to occur particularly under high pressure of an arc and under welding at a high speed in TIG welding of steel materials to each other, and is known as a humping phenomenon in which the shape of a molten pool becomes unstable, the molten pool vibrates, and severe unevenness occurs in the bead.

As a means for preventing occurrence of this separation of the bead, a method using a magnetic field and a technique exercising ingenuity in the shape of the tip section of the tungsten electrode have been proposed although they are only the technique on TIG welding of steel materials to each other. A method using a magnetic field has been proposed for example in Patent Literature 4. In the Patent Literature 4, an electromagnetic force generated by the electromagnetic interaction of a constant magnetic field applied to the periphery of a welding arc and the arc current flowing in the welding arc is applied to the welding arc to deflect the radiation shape of the welding arc to the welding line direction of the section to be bonded, and thereby two sections to be bonded are bonded continuously.

Although such the method using a magnetic field as disclosed in the Patent Literature 4 is a technique effective in preventing occurrence of separation of the bead without any question, a magnet device becomes necessary in addition. Also, according to this method, because an electromagnetic force generated by the magnet device is applied to the welding arc, control thereof is required, and it is not possible for an existing welding facility to cope with simply. It is a problem practically because the cost increase is involved.

On the other hand, techniques exercising ingenuity in the shape of the tip section of a tungsten electrode have been proposed in Patent Literature 5 and Patent Literature 6. The shape of the tip section of a general tungsten electrode is a circular conical shape similar to that of the tip of a pencil. However, in the Patent Literature 5, proposed is an electrode having a shape in which a point on the surface of an electrode for TIG welding having a ridge line at the tip section is made the distal end, and the angle formed by surfaces forming the ridge line is made 40-100 degrees. In the Patent Literature 5, the arc point is generated along a portion of the ridge line, the arc is prevented from climbing up to a portion of a surface in the vicinity of the tip of the electrode, the arc is prevented from widening in the width direction of the bead to concentrate the arc, and TIG welding with big current and high speed is tried to be enabled.

In the Patent Literature 6, it is proposed, in a TIG welding apparatus for bonding welding of steel materials having narrow beveling to each other, to direct a tungsten electrode toward a welding line from above an aluminum alloy material, to make the tip of the tungsten electrode of an eccentric shape diagonally cut at an angle of 30°-40°, and to melt the wire while rotating the tungsten electrode inside the narrow beveling.

Even when the electrode improvement technique in TIG welding of the steel materials to each other described in the Patent Literature 5 is applied to TIG welding of dissimilar metals of an aluminum alloy material and a steel material using an FCW, occurrence of separation of the bead described above cannot be prevented. The reason is considered that TIG welding of dissimilar metals of the aluminum alloy material and the steel material using the FCW is welding of dissimilar materials to each other, and therefore the welding mechanism, the generation mechanism of separation of the bead and the like thereof are different from those of TIG welding of steel materials to each other.

Also, the technique described in the Patent Literature 6 is a technique on butt welding of thick plates, and cannot be applied to lap fillet welding of thin sheets as it is.

CITATION LIST

Patent Literature

Patent Literature 1: Japanese Unexamined Patent Application Publication No. 2001-47244
Patent Literature 2: Japanese Unexamined Patent Application Publication No. 2010-207886
Patent Literature 3: Japanese Unexamined Patent Application Publication No. 2008-68290
Patent Literature 4: Japanese Unexamined Patent Application Publication No. 2008-105056
Patent Literature 5: Japanese Unexamined Patent Application Publication No. H6-328287
Patent Literature 6: Japanese Unexamined Patent Application Publication No. 2004-237326

SUMMARY OF INVENTION

Technical Problems

The present invention has been developed in order to solve the problems occurred in the past described above, and its object is to provide a method for bonding dissimilar metals to each other capable of bonding dissimilar metals of an aluminum alloy material and a steel material by TIG welding that is most widely employed for bonding steel materials to each other and the like and capable of securing excellent bead appearance and required joint strength.

Solution to Problems

An aspect of the method for bonding dissimilar metals to each other of the present invention is a method for bonding dissimilar metals to each other, including the steps of overlaying at least a part of an aluminum alloy material and a steel material each other, and fillet welding the aluminum alloy material and the steel material by DC TIG welding using a bar-like tungsten electrode while feeding a flux-cored wire to a step section formed by an end of the aluminum alloy material and the surface of the steel material with the aluminum alloy material side being made a positive pole, in which the tungsten electrode includes a tip section of a shape asymmetric with respect to the axis of the tungsten electrode, the tip includes a tip surface shaped at an angle of 20° or more and 40° or less relative to the axis, and, during welding, an arc generated from a tip of the tungsten electrode is directed to the steel material side by directing the tungsten electrode to a welding line from the upper side of the aluminum alloy material so that the tip of the tungsten electrode is directed to the steel material side and that the tip surface is directed to the aluminum alloy material side. Hereinafter, this invention may be referred to as the first aspect of the present invention.

Another aspect of the method for bonding dissimilar metals to each other of the present invention is a method for bonding dissimilar metals to each other, including the steps of overlaying at least a part of an aluminum alloy material and a steel material each other, and fillet welding the aluminum alloy material and the steel material by DC TIG welding using a bar-like tungsten electrode while feeding a flux-cored wire to a step section formed by an end of the aluminum alloy material and the surface of the steel material with the aluminum alloy material side being made a positive pole, in which, during welding, a tip section of the tungsten electrode is arranged at a position of a range of 0 mm or more and less than 3.5 mm from an end of the aluminum alloy material to the aluminum alloy material side in the direction parallel to the aluminum alloy material and a position vertically departing by 2.0 mm or more and less than 4.5 mm from the surface of the aluminum alloy material in a state the tungsten electrode is tilted by an angle over 5° and less than 35° to the aluminum alloy material side from the direction orthogonal to the aluminum alloy material. Hereinafter, this invention may be referred to as the second aspect of the present invention.

A still other aspect of the method for bonding dissimilar metals to each other of the present invention is a method for bonding dissimilar metals to each other, including the steps of overlaying at least a part of an aluminum alloy material and a steel material each other, and fillet welding the aluminum alloy material and the steel material by DC TIG welding using a bar-like tungsten electrode while feeding a flux-cored wire to a step section formed by an end of the aluminum alloy material and the surface of the steel material with the aluminum alloy material side being made a positive pole, in which, during welding, a tip section of the tungsten electrode is arranged in a position vertically departing by 2.0 mm or more and less than 4.5 mm from the surface of the aluminum alloy material and a position where an extension line of the axis of the tungsten electrode crosses the surface of the aluminum alloy material is arranged in a range of 1.0 mm or more and less than 3.0 mm from an end of the aluminum alloy material to the aluminum alloy material side in a state the tungsten electrode is tilted by 35° or more and and less than 60° to the steel material side from the direction orthogonal to the steel material. Hereinafter, this invention may be referred to as the third aspect of the present invention.

In the first to third aspects of the present invention, it is preferable that the flux-cored wire is fed from the welding proceeding direction.

Advantageous Effects of Invention

According to the method for bonding dissimilar metals to each other of the present invention, in dissimilar metals bonding of an aluminum alloy material and a steel material, occurrence of separation of the bead can be prevented and excellent bead appearance and required joint strength can be secured by TIG welding that is most widely employed for bonding steel materials to each other and the like.

BRIEF DESCRIPTION OF DRAWINGS

FIGS. 1, 1(a) is a side view showing the shape of a tip section of an electrode in the first aspect of the invention, and 1(b) is a front view showing the shape of the tip section of the electrode of 1(a).

FIGS. 3, 3(a) is a side view showing the shape of a tip section of an electrode of a comparative example, and 3(b) is a front view showing the shape of the tip section of the electrode of 3(a).

DESCRIPTION OF EMBODIMENTS

Figure 1:
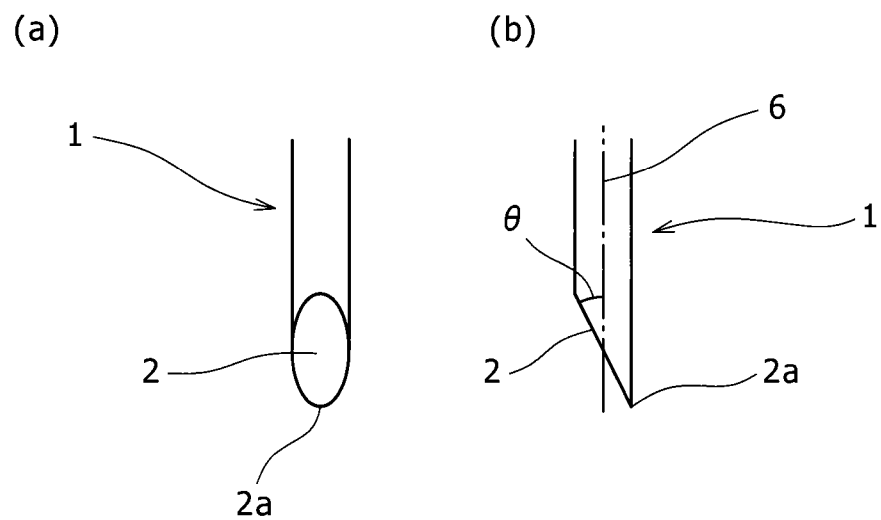

The present inventors made intensive researches in order to find out a proper condition for executing dissimilar metals bonding of an aluminum alloy material and a steel material to each other by TIG welding that was most widely employed for bonding of steel materials to each other and the like without generating separation of a bead.

(Cause of Generation of "Separation (Molten Metal Separation) of Bead")

According to the knowledge of the present inventors, the cause of generation of "separation of bead" in TIG welding of a lap joint of an aluminum alloy material and a steel material is that an arc generated from generalized tungsten electrode is offset (biased) to the aluminum alloy material side. Due to the bias of the arc to the aluminum alloy material side, the temperature on the steel material side does not rise sufficiently, the flux fed from the FCW does not spread over the steel sheet, and the wettability of the molten aluminum and the steel sheet cannot be improved.

This will be described more specifically using FIG. 10.

When an arc 3 generated from a tungsten electrode 30 is biased to an aluminum alloy material 11 side, the aluminum alloy material 11 starts to melt first, and melting start of an FCW 7 is delayed inevitably. As a result, the flux does not spread sufficiently over the surface of a steel material 12, and secureness of the wettability of the aluminum alloy molten metal against the steel material 12 side becomes hard, the aluminum alloy molten metal becoming the bead on the steel material 12 side in the aluminum alloy material 11. Also, it is considered that spreading of the flux over the surface of the steel material 12 is impeded because the temperature rise of the steel material 12 is also delayed relatively due to the bias of the arc 3 to the aluminum alloy material 11 side.

Due to these phenomena, the molten metal formed by melting of the aluminum alloy material 11 becomes hard to be wetted and widened to the steel material 12 side. Further, the molten metal formed by melting of the aluminum alloy material 11 is pushed to the aluminum alloy material 11 side (left side in FIG. 10) by the arc 3 that is biased to the aluminum alloy material 11 side. This molten metal comes to be solidified as a bead 4*a* in a state moved to the aluminum alloy material 11 side. As the melting range of the aluminum alloy material 11 becomes wider, the molten metal formed by melting of the aluminum alloy material 11 comes to move more greatly to the aluminum alloy material 11 side.

On the other hand, the molten metal formed by melting of the FCW 7 widens over the surface of the steel material 12 by an effect of the flux. However, the molten metal formed by melting of the FCW 7 comes to be pushed to the direction opposite of the aluminum alloy material 11 side (right side in FIG. 10) by the arc 3 generated from the tungsten electrode 30. As a result, the molten metal formed by melting of the FCW 7 does not mix with the molten metal formed by melting of the aluminum alloy material 11 and is solidified as a separate bead 4*b* in a state separate from the bead 4*a* described above. As a result, separation of the bead comes to occur.

(Countermeasure Against Separation of Bead)

In order to suppress such mechanism of separation of the bead and to prevent generation of separation the bead, a person with an ordinal skill in the art considers that measures (1) (2) below are necessary in general. They are, (1) to melt the FCW 7 as quickly as possible and to secure the wettability. (2) To suppress the melting range of the aluminum alloy material 11, and to reduce movement of the molten aluminum to the aluminum alloy material 11 side. However, melting of the aluminum alloy material 11 over the entire region in the thickness (sheet thickness) direction should be secured.

Also, when such measures are to be followed, as a person with an ordinal skill in the art, a concrete improvement of the welding operation condition described below can be devised.

(Comparative Improvement Technique 1: Target Position of Electrode)

Figure 10:
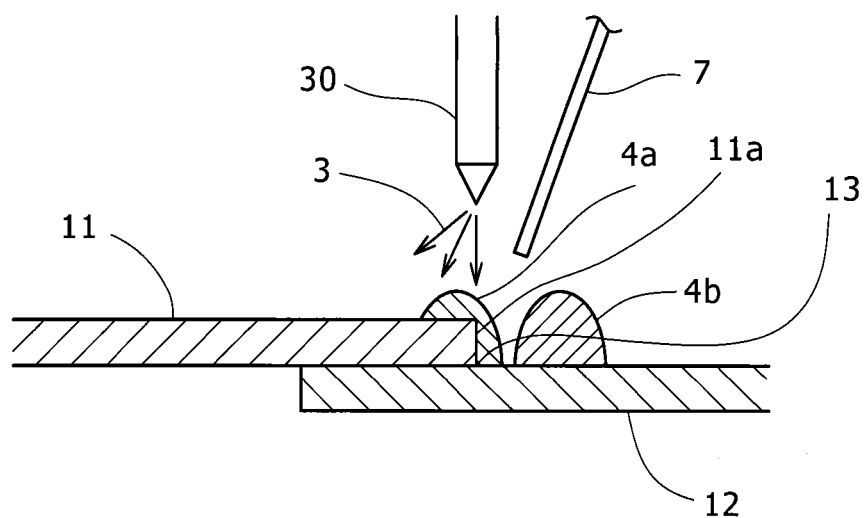
FIG. 10 is an explanatory drawing showing a state of separation of a bead occurring in TIG welding.

It can be devised that, by moving the position of the tungsten electrode (torch) 30 of FIG. 10 by 0.5 mm to the steel material 12 side (right side of FIG. 10), the heat input to the aluminum alloy material 11 side is reduced. However, because the stronger arc 3 was generated between the tip of the electrode and the upper end of the aluminum alloy material 11, the occurrence prevention effect of separation of the bead was small. Also, when the tungsten electrode 30 moved by 1 mm to the steel material 12 side, the arc 3 was generated strongly between the electrode 30 and the steel material 12, the steel material started to melt, and bonding itself could not be executed.

(Comparative Improvement Technique 2: Torch Angle)

In welding of an aluminum alloy material and steel, in order to melt only the aluminum alloy material while avoiding melting of the steel, heat input is executed from above an aluminum alloy sheet in general. However, in FIG. 10, in order to suppress the melting range of the aluminum alloy material 11, welding was executed so that the tungsten electrode (torch) 30 inclined by 10° relative to the normal line direction of the sheet while the tungsten electrode 30 was orthogonal with the welding line, and the tip thereof targeted the lap section of the aluminum alloy material 11 and the steel material 12. As a result, although melting on the aluminum alloy material 11 side could be suppressed a little, separation of the bead could not be prevented perfectly.

(Comparative Improvement Technique 3: Power Source)

In FIG. 10, by changing the power source from an AC power source to a DC power source, widening of the arc 3 to the aluminum alloy material 11 side could be suppressed, and the melting range of the aluminum alloy material 11 became small. However, even in this case, suppression of separation of the bead could not be reached.

From these results, it was known that the problem of separation of the bead was hard to be solved by changing the welding operation condition that was based on the general measures described above. Therefore, the present inventors studied a new countermeasure substituting these improvement techniques of the welding operation. As a result, the present inventors thought of the idea of changing distribution of the heat input to the aluminum alloy material/FCW/steel material and also suppressing movement of the molten metal of the aluminum alloy material to the aluminum alloy material side by directing the direction of the arc to the steel material side, and thereby preventing separation of the bead. Also, the present inventors got the knowledge that the shape of the tip section and the positional relation of the tip section of the tungsten electrode during welding largely affected distribution of the heat input to the aluminum alloy material/FCW/steel material in a state the direction of the arc was directed to the steel material side.

In this regard, with the shape of the tip section of the electrode having been proposed from the past, or only with a device of the shape of the tip section of the electrode, "separation of the bead" cannot be prevented when TIG welding is applied to dissimilar metals bonding of an aluminum alloy material and a steel material. That is, according to the first aspect of the present invention, the problem of "separation of the bead" is solved by making the shape of the tip section of the tungsten electrode a so-called eccentric shape and directing the arc to the steel material side by stipulating the positional relation of the tip section of such eccentric shape during welding.

[First Aspect of Invention]

(Tip Section Shape of Electrode)

Figure 2:
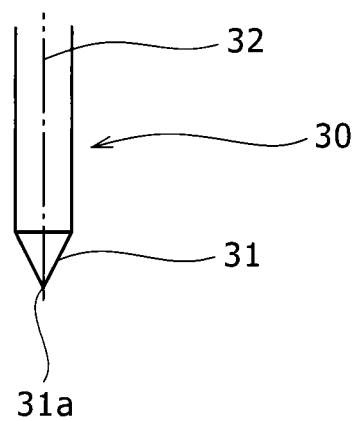
FIG. 2 is a front view showing the shape of a tip section of an electrode of a conventional circular conical shape.
Figure 3:
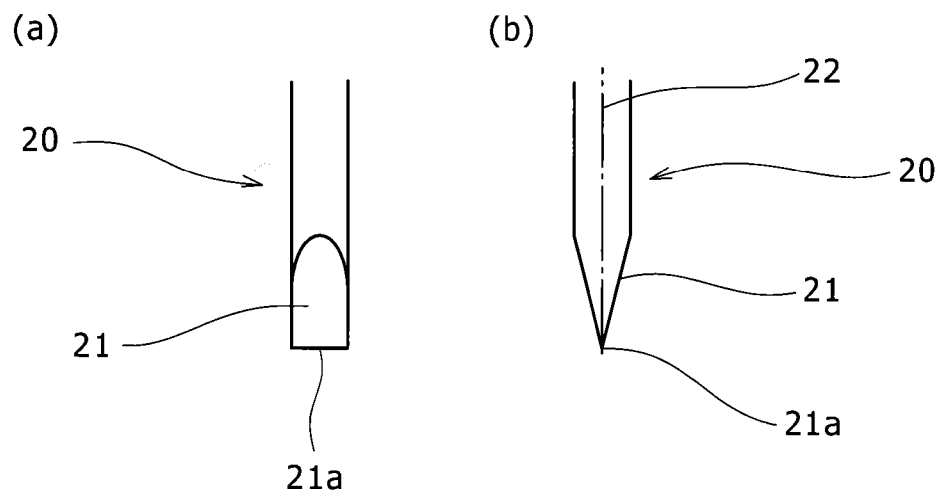

First, the shape of the tip section (eccentric tip section shape) of the electrode for TIG welding in the first aspect of the invention will be described specifically referring to FIGS. 1-3. FIG. 1(*a*) is a side view showing the tip section of the tungsten electrode for TIG welding in the present invention, and (b) is a front view showing the tip section of the tungsten electrode shown in (a). FIG. 2 is a front view showing the tip section of the circular conical shape of a conventional electrode. FIG. 3(*a*) is a side view showing the tip section of an electrode of a comparative example, and (b) is a front view showing the tip section of the tungsten electrode shown in (a).

Normally, a tip section 31 of the conventional tungsten electrode 30 has a circular conical shape symmetric with respect to an electrode axis 32 shown in a chain line as shown in FIG. 2. Therefore, even when the direction and the positional relation of the tungsten electrode 30 during welding or the welding condition are devised, the arc from a tip 31*a* cannot be directed to the steel material side as shown in an example described below.

On the other hand, the tip section of a tungsten electrode 1 in the first aspect of the invention having an acicular and only tip 2*a* has a tip surface (cut surface) 2 diagonally cut only in one side (the aluminum alloy material 11 side described below, the left side of FIG. 1(*b*)) with respect to an electrode axis 6 shown in a chain line. As a result, the tip section is asymmetric with respect to the electrode axis 6 and has an inverted triangle shape having the only tip 2*a* as shown in FIG. 1(*b*). Thus, in the first aspect of the invention, the tungsten electrode 1 having the tip section of a shape biased to one side asymmetrically with respect to the electrode axis 6 is used, and the direction and the positional relation of the tungsten electrode 1 during welding are properly set (will be described below). Thus, the arc generated from the tip 2a of the tungsten electrode 1 can be directed more to the steel material side.

Here, the tip angle θ of the tip surface 2 of the tungsten electrode 1 that is the angle θ of the tip surface 2 diagonally cut upward from the only (being a pin point) tip 2a with respect to the electrode axis 6 in the first aspect of the invention is in the range of 20° or more and 40° or less. Even when the tip angle θ is excessively small or excessively large reversely deviating from this range, the arc from the tip 2a of the tungsten electrode 1 comes to be hardly directed to the steel material side. Also, this range of the angle is necessary from the necessity of suppressing consumption of the electrode. Even when the tip angle θ is excessively small or excessively large reversely deviating from this range, consumption of the electrode increases.

The tip 2a of the tungsten electrode 1 has the shape of the only crown that is sharp and with an acute angle, or an acicular tip shape. However, this tip 2a may have the shape of the crown (tip shape) exhibiting fine roundness or having fine corner part and flat part as far as it is in the range not undermining the effect of directing the arc from the tip 2a of the tungsten electrode 1 to the steel material side and not consuming the electrode. Also, the angle (tip angle) θ of the tip surface diagonally cut may not be a same angle (uniform angle) over the entire length of the tip surface, and may change gradually or stepwise within the range of 20° or more and 40° or less. In the meantime, the length of the diagonally cut portion of the tip surface 2 of the tungsten electrode 1 of the present invention from the tip 2a in the axial direction can be calculated from the tip angle θ and the diameter of the electrode set, and is determined inevitably. As an indication in the range of the diameter 1.0-4.0 mmΦ of a normal tungsten electrode used in TIG welding, this length may be in the range of 1.2-11 mm.

FIGS. 3(*a*) and 3(*b*) show an electrode 20 of the comparative example. A tip section 21 of the electrode 20 has an only acicular tip 21a having the tip angle θ of 20° or more and 40° or less with respect to an electrode axis 22, and has the shape of an inverted triangle. However, although the tip section 21 of the electrode 20 of the comparative example has the tip section shape with an acute angle, it is symmetrical with respect to the electrode axis 22. This is different from that the tip surface 2 of the tungsten electrode 1 of the first aspect of the invention is asymmetric with respect to the electrode axis 6 by being diagonally cut only in one side with respect to the electrode axis 6 and has the shape unevenly distributed to one side. Therefore, even if combined with the direction and positional relation of the tungsten electrode 20 during welding, it is not possible to effectively direct the arc from the tip 21a of the tungsten electrode 20 to the steel material side (will be described below).

(Direction and Positional Relation of Electrode During Welding)

As described above, only by the asymmetric shape of the tip surface 2 in which only one side of the tip section of the tungsten electrode 1 is diagonally cut, it is not possible to direct the arc from this tungsten electrode 1 to the aluminum alloy material side. In order to direct the arc from the tip 2a of the tungsten electrode 1 to the steel material side, as shown in FIG. 4, the direction of the tip surface 2 with respect to the aluminum alloy material 11 side and the positional relation of an end 11a of the aluminum alloy material 11 which is the welding line and the only tip 2a are important.

This will be described referring to FIGS. 4-8 which are the explanatory drawings showing the TIG welding operation examples using the electrodes of FIGS. 1(*a*) and 1(*b*), FIG. 2, and FIGS. 3(*a*) and 3(*b*).

Figure 4:
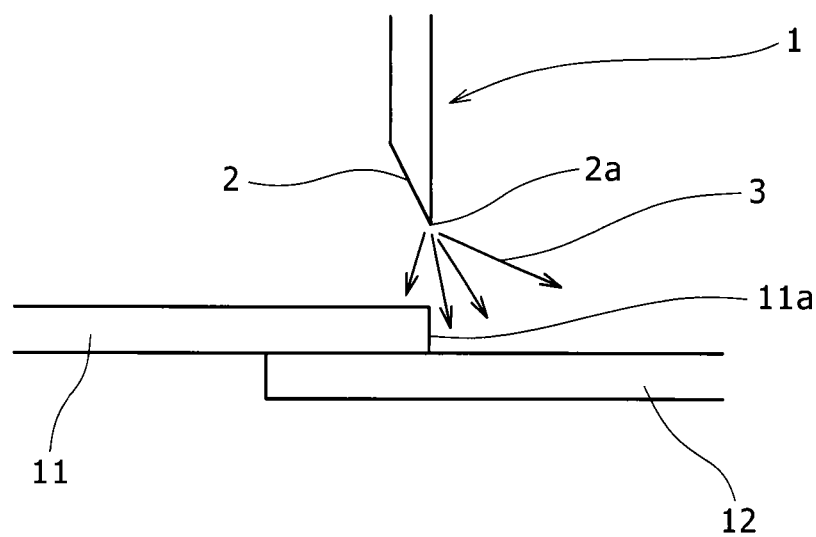
FIG. 4 is an explanatory drawing showing a TIG welding operation example of the present invention using the electrode of FIGS. 1(a) and 1(b).

FIG. 4 shows an example of the first aspect of the invention. In FIG. 4, the acicular tip 2a of the tungsten electrode is positioned right above the end 11a of the aluminum alloy material 11 overlaid on top of the steel material 12 that is right above the welding line, and is directed downward from the top. Also, the tungsten electrode 1 simultaneously directs the tip surface 2 of an asymmetric shape in which only one side is diagonally cut to the aluminum alloy material 11 side.

Thus, the arc 3 (shown by plural arrow marks; same in drawings below) generated from the tip 2a of the tungsten electrode 1 can be directed to the steel material 12 side as shown in the drawing. Thus, the direction of the arc is directed to the steel material 12 side, and distribution of the heat input to the aluminum alloy material/FCW/steel material can be changed. Therefore, movement of the molten metal of the aluminum alloy material 11 to the aluminum alloy material 11 side can be suppressed, a required amount can be moved to the steel material 12 side, and separation of the bead can be effectively prevented.

Also, the effect of the flux by the FCW can be also exhibited without excessive heat input to the steel material 12 as in the improvement techniques 1 and 2 in which the electrode 1 is shifted to the steel material side. Thus, a reaction layer (interface reaction layer) of steel and aluminum can be obtained properly thin in the bonding interface of the aluminum alloy material 11 and the steel material 12.

In order to obtain a joint having sufficient strength by steel-aluminum dissimilar metals bonding, it is necessary to distribute the reaction layer (intermetallic compound layer) of steel and aluminum thin and uniformly. When steel is molten simultaneously with aluminum in steel-aluminum TIG welding, a great amount of brittle intermetallic compound is formed, a crack is generated, or even when a crack is not generated, sufficient bonding strength cannot be secured. On the other hand, only by making molten aluminum contact the cooled steel material side, the temperature of the contact part drops within a very short time, the effect of the flux used for removal of the oxide film and improvement of the wettability cannot be exerted sufficiently, required reaction layer cannot be obtained, and sufficient bonding strength cannot be secured. Therefore, the temperature on the steel material side should be raised within a necessary range but not excessively.

On the other hand, even when the aluminum alloy material is molten insufficiently, a bonding failure (the case bonding is not executed over the entire sheet thickness) occurs. Therefore, conditions required for both should be satisfied simultaneously which is to melt the aluminum alloy material to be welded whereas to raise the temperature of the steel material but not to melt the steel material.

In the first aspect of the invention, due to the synergetic effect of them, even in dissimilar metals bonding by linear welding under the efficient TIG welding operation condition, a joint with excellent bead appearance and high bonding strength can be obtained. That is, all of prevention of separation of the bead, suppression of the reaction layer (interface reaction layer) of steel and aluminum, secureness of weld penetration of aluminum and the like in the interface which are hardly achieved simultaneously can be achieved in order to secure high bonding strength of a dissimilar materials welding joint in TIG welding under the efficient operation condition.

In order to exert these effects, in arrangement (positional relation) of the electrode 1 and the aluminum alloy material 11, it is preferable that the tip 2a of the electrode 1 is arranged at the position right above the end 11a of the aluminum alloy material 11 (welding line) as this FIG. 4. Also, it is preferable that the direction of the electrode 1 in the up-down direction is vertical direction in the direction orthogonal to the welding line of FIG. 4. However, because deflection and deviation of the condition in actual welding operation are required to be allowed, it is recommended that the deviation in the vertical direction from the welding line (end 11a) is within ±0.5 mm, and the deviation of the angle is within ±5° in the direction orthogonal to the welding line of FIG. 4.

Also, it is a matter of course that welding may be executed with the angle of advance a of within approximately 15° with respect to the welding direction (the direction of the welding line, the extending direction of the end 11a of the aluminum alloy material 11) as FIG. 9 described below.

Further, in the first aspect of the invention, as described above, the tip surface 2 of the asymmetric shape in which only one side of the tungsten electrode 1 is diagonally cut is directed to the aluminum alloy material 11 side (left side of FIG. 4). This tip surface 2 is arranged so as to be parallel to the welding direction (the direction of the welding line, the extending direction of the end 11a of the aluminum alloy material 11 that extends from the front to the back of FIG. 4). However, the direction of the tip surface 2 may not necessarily be parallel to the welding line, and the direction of the tip surface 2 may be the direction crossing with the welding line (the extending direction of the end of the aluminum alloy material 11) a little. The permissible amount of this angle of crossing is determined by whether the arc 3 generated from the tip 2a of the tungsten electrode can be effectively directed to the steel material 12 side or not.

Figure 5:
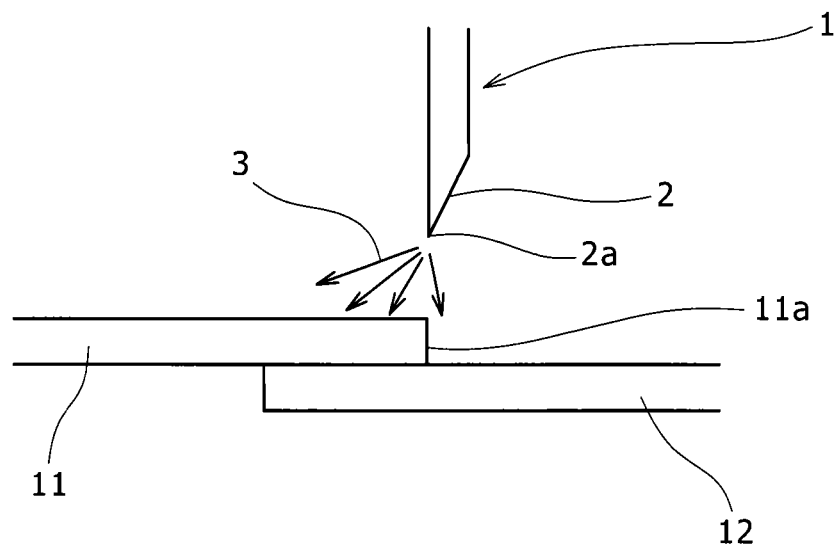
FIG. 5 is an explanatory drawing showing a TIG welding operation example of the comparative example using the electrode of FIGS. 1(a) and 1(b).
Figure 6:
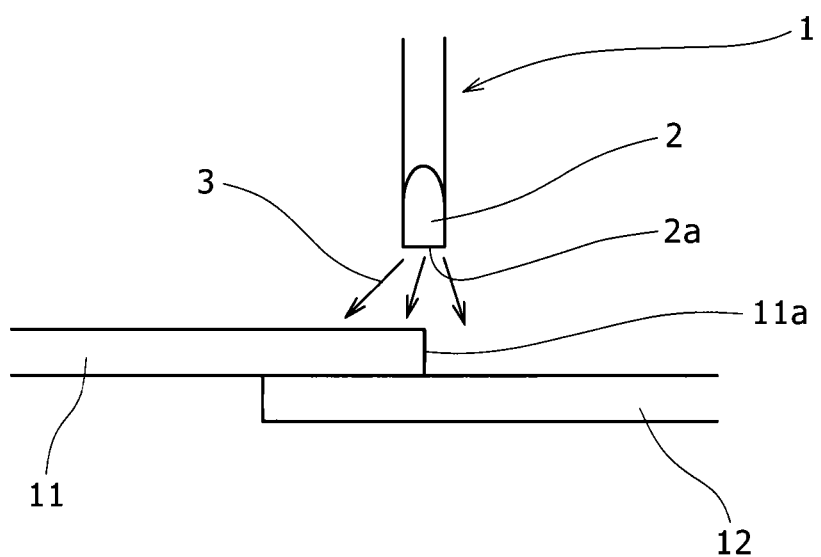
FIG. 6 is an explanatory drawing showing a TIG welding operation example of the comparative example using the electrode of FIGS. 1(a) and 1(b).

On the other hand, in FIGS. 5, 6, although the tungsten electrode 1 of the first aspect of the invention is used, the direction of the tip surface 2 of the asymmetric shape on the aluminum alloy material 11 side and the positional relation of the only tip 2a and the end 11a of the aluminum alloy material 11 which is the welding line deviate from the range of the present invention. Therefore, as shown in the direction of the arc 3 of FIGS. 5, 6, the arc 3 from the tip 2a of the tungsten electrode is not directed to the steel material 12 side.

That is, in FIGS. 5, 6, the position of the acicular tip 2a of the tungsten electrode 1 is at the position of the end 11a of the aluminum alloy material 11, that is right above the welding line, similarly to FIG. 4. Nevertheless, in FIG. 5, the tip surface 2 of an asymmetric shape of the tungsten electrode is directed to the steel material 12 side which is opposite to the aluminum alloy material 11 side. Also, in FIG. 6, the direction of the tip surface 2 of an asymmetric shape is the direction crossing the extending direction of the end 11a of the aluminum alloy material 11 by 90°.

Figure 7:
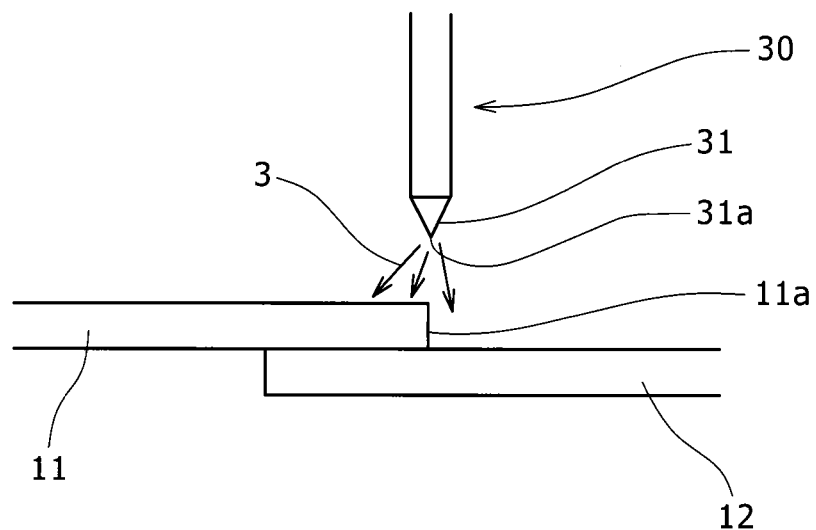
FIG. 7 is an explanatory drawing showing a conventional TIG welding operation example using the conventional electrode of FIG. 2.
Figure 8:
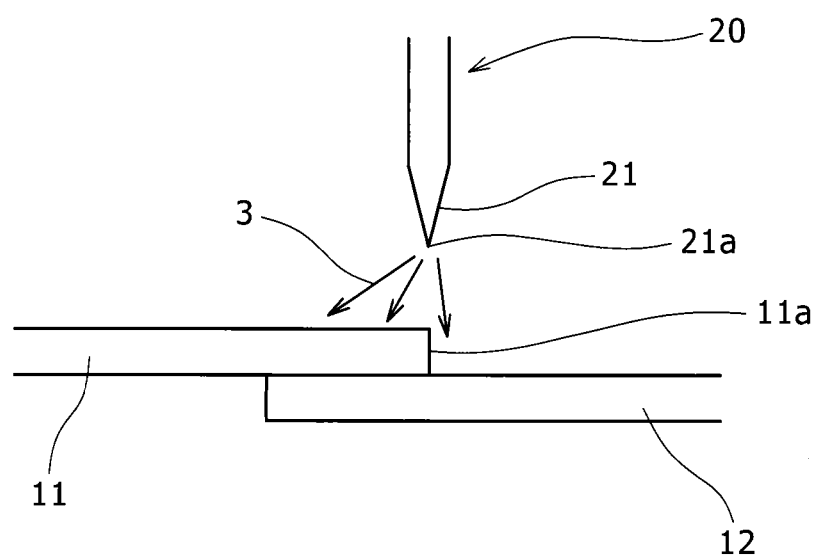
FIG. 8 is an explanatory drawing showing a TIG welding operation example of the comparative example using the comparative example electrode of FIGS. 3(a) and 3(b).

Also, FIG. 7 is an example using the electrode 30 having the conventional tip section 31 of FIG. 2, and FIG. 8 is an example using the electrode 20 having the tip section 21 of the comparative example of FIGS. 3(*a*) and 3(*b*). In these examples, each position of the acicular tips 31a, 21a of the tungsten electrode is the position of the end 11a of the aluminum alloy material 11, that is right above the welding line, similarly to FIG. 4. However, in these examples, as shown in the direction of the arc 3 of FIGS. 7, 8, the arc 3 generated from the tip of the tungsten electrode could not be directed effectively to the steel material 12 side.

In the meantime, it was also considered that, when the electrode of FIGS. 3(*a*) and 3(*b*) was used, widening of the arc to the direction orthogonal to the tip line of the electrode could be suppressed, and the effect of controlling the melting range and the heating range could be expected. However, in fact, although widening of the arc 3 was suppressed, biasing of the arc 3 to the aluminum alloy material 11 side could not be improved, and quick melting of the FCW was hard. Therefore, the molten metal of the aluminum alloy material 11 moved to the aluminum alloy material 11 side, mixture of the FCW and the molten metal became insufficient, and separation of the bead could not be prevented.

(TIG Welding Operation)

TIG welding operation of the present invention is advantageous in terms that ordinary efficient TIG welding apparatus and welding condition can be used. FIG. 9 shows an example of TIG welding operation of the present invention.

Figure 9:
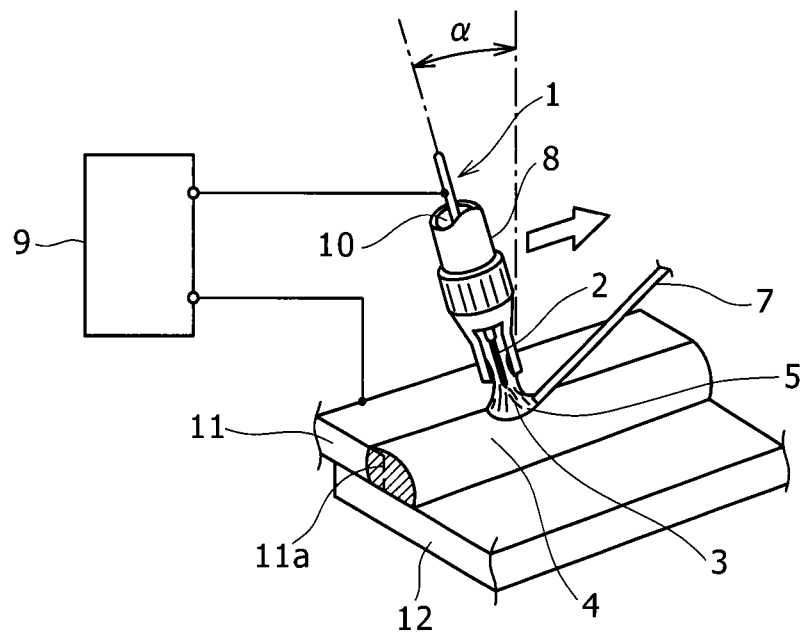
FIG. 9 is a perspective view showing an operation example of general TIG welding.

As FIG. 9 and as shown in FIG. 4, in the present invention, as the premise of TIG welding of different materials to each other, a lap joint is formed in which the end of the aluminum alloy material 11 is overlaid on top of the steel material 12 with the aluminum alloy material 11 being placed on the upper side.

(Positional Relation of Steel Material and Aluminum Alloy Material)

Here, when lap fillet welding and the like is executed using TIG welding utilizing an FCW (flux-cored wire), as shown in FIGS. 4, 9, the arc is normally generated downward from the electrode 1 arranged above the aluminum alloy material 11. In such welding operation direction, the aluminum alloy material 11 (end) is placed in the upper side and the steel material 12 (end) is placed in the lower side so that they overlap each other, and they are welded to each other. Such positional relation in the joint is preferable in order to form an excellent bead by the aluminum welding material over the welding surfaces of both of the steel material 12 and the aluminum alloy material 11 and to obtain a dissimilar metals bonding body (joint) with high bonding strength.

When this positional relation is opposite, that is, when the steel material 12 is placed in the upper side and the aluminum alloy material 11 is placed in the lower side with respect to the welding operation direction so that they overlap each other and are welded to each other, high bonding strength cannot be secured. The reason is that, under such positional relation, the bead by the aluminum welding material is hardly formed particularly on the welding surface of the steel material 12 side. This is because, when the aluminum alloy material 11 side comes to the lower side with respect to the welding operation direction, the molten aluminum hardly widens over the welding surface on the steel material 12 side which is in the upper side. In this case, feeding of the flux to the steel material surface becomes insufficient simultaneously, the wettability improvement effect of the molten aluminum and steel is small, and excellent bonding cannot be executed as a result.

[Welding Operation]

FIG. 9 shows an operation example of TIG welding in relation with the present invention. With the exception of the tip section shape and positional relation of the electrode by the present invention of FIG. 4 described above, FIG. 9 shows a form of generalized TIG welding apparatus and operation method. Also, capability of using such generalized TIG welding is an advantage of the present invention.

In FIG. 9, a TIG welding machine generates the arc 3 between the tungsten electrode 1 which is a non-consumable electrode and the aluminum alloy material 11 which is made the positive pole side by a TIG welding power source 9 with DC constant current characteristics. Also, welding is executed from the left side of FIG. 9 toward the right side as the direction of the arrow mark with the end 11a of the aluminum alloy material 11 being made the welding line. Here, in the lap fillet welding as the present invention (refer to FIG. 9 or FIG. 4-FIG. 10), normally, the end of the upper sheet that is the end 11a of the aluminum alloy material 11 becomes the welding line.

In this case, as is widely known, inert gas 10 such as Ar and the like is fed to the welding section from an opening in the lower part of a gas nozzle 8 surrounding the electrode. Also, in order to improve the efficiency of the welding operation and the bonding strength, the FCW (flux-cored wire) 7 is fed to the welding line from a feeding device not illustrated. It is preferable that such the FCW 7 is fed from the proceeding direction (front side) of welding from the viewpoint of welding efficiency and in order to form an excellent bead. Also, in FIG. 9, a molten pool 5 and a bead 4 formed by the arc 3 (directed to the steel material side because of the electrode 1 of FIGS. 1(a) and 1(b) and the arrangement of FIG. 4) are shown.

In the meantime, in the first aspect of the invention, because the tip section of the tungsten electrode is required to be worked into a shape different from that of the ordinary one, the components used in the current facility should be replaced. Therefore, the present inventors further made a lot of intensive researches in order to find out proper conditions enabling dissimilar metals bonding of an aluminum alloy material and a steel material by TIG welding without generating separation of the bead using the components used in the current facility as they are.

As a result, the present inventors found out to execute TIG welding by DC TIG welding, to incline the tungsten electrode at proper inclination relative to an aluminum alloy material and a steel material to be welded, and to arrange the tip section of a tungsten electrode at a proper position, and completed the second aspect and third aspect of the invention. According to the second aspect and third aspect of the invention, dissimilar metals bonding of an aluminum alloy material and a steel material can be executed by TIG welding without generating separation of the bead.

[Second Aspect of Invention]

Below, the second aspect of the invention will be described in further more detail based on an embodiment shown in the attached drawings.

Figure 11:
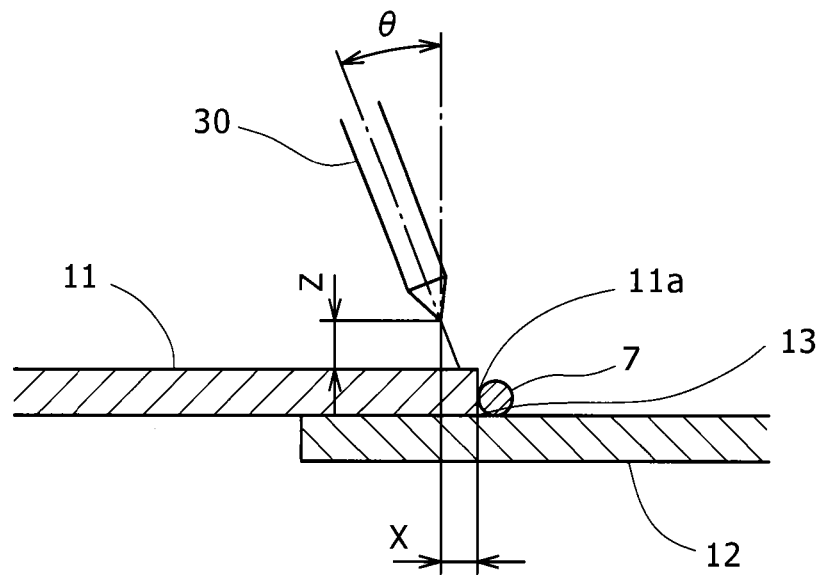
FIG. 11 is a vertical cross-sectional view showing an embodiment of the dissimilar metals bonding method of the second aspect of the present invention.

In the second aspect of the invention, as shown in FIG. 11 for example, first, at least a part of the aluminum alloy material 11 and the steel material 12 are overlaid each other. Then, the arc 3 is generated using the bar-like tungsten electrode 30 while feeding the flux-cored wire (FCW) 7 to a step section 13 formed by the end 11a of the aluminum alloy material 11 and the surface of the steel material 12 with the aluminum alloy material 11 side being made the positive pole. Thus, TIG welding of the aluminum alloy material 11 and the steel material 12 is executed.

In executing this TIG welding, only by melting of the aluminum alloy material 11 by the arc 3 irradiated from the tip section of the tungsten electrode 30, the temperature of the steel material 12 does not rise sufficiently. As a result, because the flux fed from the FCW 7 does not widen over the surface of the steel material 12 and the wettability against the molten metal of the aluminum alloy cannot be improved, excellent bead cannot be formed, and sufficient bonding strength cannot be secured as a result.

On the other hand, when the steel material 12 is heated directly by the arc 3 irradiated from the tip section of the tungsten electrode 30, the surface of the steel material 12 is molten. As a result, a very brittle intermetallic compound layer of Fe and Al is formed in the bonding interface of the aluminum alloy material 11 and the steel material 12, and sufficient bonding strength cannot be secured.

As a result of a lot of intensive researches carried out based on them, the present inventors found out a proper welding condition capable of properly heating the surface of the steel material 12 also while securing melting of the aluminum alloy material 11 and the FCW 7.

(Power Source)

First, the power source is changed from an AC power source generally used for welding of the aluminum alloy material 11 to a DC power source. That is, TIG welding is executed by DC TIG welding. By DC TIG welding, the melting range of the aluminum alloy material 11 can be reduced.

(Inclination of Tungsten Electrode)

In FIG. 11, TIG welding is executed tilting the tungsten electrode 30 to the direction opposite of the conventional lap fillet direction purposely. That is, TIG welding is executed with the tungsten electrode 30 being tilted to the aluminum alloy material 11 side from the direction orthogonal to the surface of the aluminum alloy material 11. As a result, the present inventors found out that a condition existed at which the bead could be stably formed without generating separation of the bead which contradicted the conventional common technical knowledge.

When the inclination angle of the tungsten electrode 30 is excessively small, generation of separation of the bead cannot be prevented. On the other hand, when the inclination angle of the tungsten electrode 30 is excessively large, it is hard to melt the aluminum alloy material 11 over the entire thickness. Therefore, the inclination of the tungsten electrode 30 is to be made a state inclined to the aluminum alloy material 11 side from the direction orthogonal to the surface of the aluminum alloy material 11 by over 5° and less than 35° ($5°<\theta<35°$).

(Arrangement of Tip Section of Tungsten Electrode)

The tip section of the tungsten electrode 30 should be arranged on the aluminum alloy material 11 side (left side in FIG. 11) at least including the end 11a of the aluminum alloy material 11 in the direction parallel to the surfaced of the aluminum alloy material 11. Also, the tip section of the tungsten electrode 30 should be arranged in the upper part, that is on the vertical line orthogonal to the surface of the aluminum alloy material 11.

When the tip section of the tungsten electrode 30 is on the steel material 12 side (right side in FIG. 11) of the end 11a of the aluminum alloy material 11, melting of the aluminum alloy material 11 tends to become insufficient. Also, the heat input to the steel material 12 increases excessively, and a thick intermetallic compound layer is easily formed in the bonding section interface of the aluminum alloy material 11 and the steel material 12. Therefore, even when the bead is formed, sufficient bonding strength cannot be secured.

On the other hand, when the tip section of the tungsten electrode 30 is arranged unnecessarily on the aluminum alloy material 11 side from the end 11a of the aluminum alloy material 11, melting of the FCW 7 becomes insufficient. Also, the temperature rise of the steel material 12 becomes insufficient, the wettability improvement effect of the flux cannot be exerted, and sufficient bonding strength cannot be secured even when the bead is formed in this case also.

Therefore, the tip section of the tungsten electrode 30 should be arranged at a position within a range of 0 mm or more and less than 3.5 mm on the aluminum alloy material 11 side from the end 11a of the aluminum alloy material 11 (x=0 mm or more and less than 3.5 mm) in the direction parallel to the surface of the aluminum alloy material 11 and departing perpendicularly from the surface position of the aluminum alloy material 11 (on the vertical line orthogonal to the surface of the aluminum alloy material 11). Also, here, "the aluminum alloy material 11 side" means closer to the center of the aluminum alloy material 11 from the start point of the end 11a of the aluminum alloy material 11.

Further, although the tip section of the tungsten electrode 30 should be arranged at a position vertically departing from the surface position of the aluminum alloy material 11 as described above, it should be arranged at least at a position departing vertically by 2.0 mm or more and less than 4.5 mm (z=2.0 mm or more and less than 4.5 mm). Furthermore, this position is affected also by the sheet thickness of the aluminum alloy material 11, the inclination angle of the tungsten electrode 30, the position in the horizontal direction of the tip section of the tungsten electrode 30, and the welding condition (the current and voltage, welding speed, FCW feeding speed).

[Third Aspect of Invention]

Next, the third aspect of the invention will be described in further more detail based on an embodiment shown in the attached figures.

Figure 13:
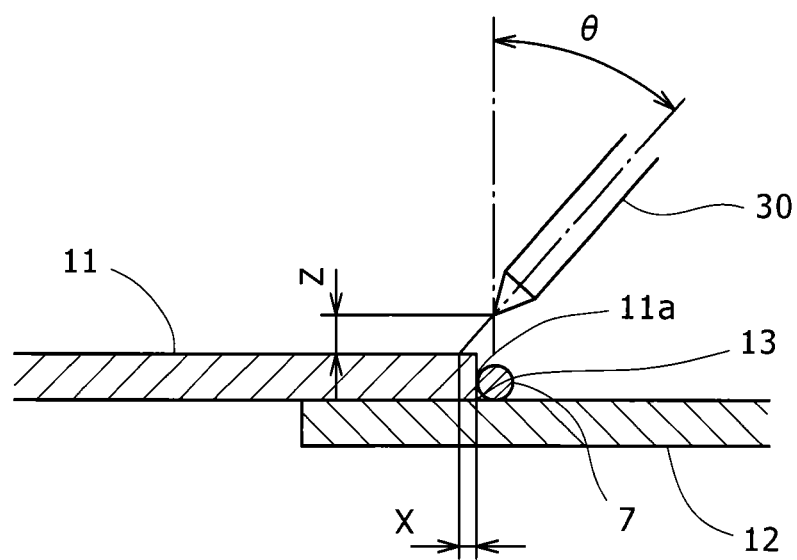
FIG. 13 is a vertical cross-sectional view showing an embodiment of the dissimilar metals bonding method of the third aspect of the present invention.

In the present aspect of the invention, as shown in FIG. 13 for example, first, at least a part of the aluminum alloy material 11 and the steel material 12 are overlaid each other. Then, the arc 3 is generated using the bar-like tungsten electrode 30 while feeding the flux-cored wire (FCW) 7 to a step section 13 formed by the end 11a of the aluminum alloy material 11 and the surface of the steel material 12 with the aluminum alloy material 11 side being made the positive pole. Thus, TIG welding of the aluminum alloy material 11 and the steel material 12 is executed.

Figure 12:
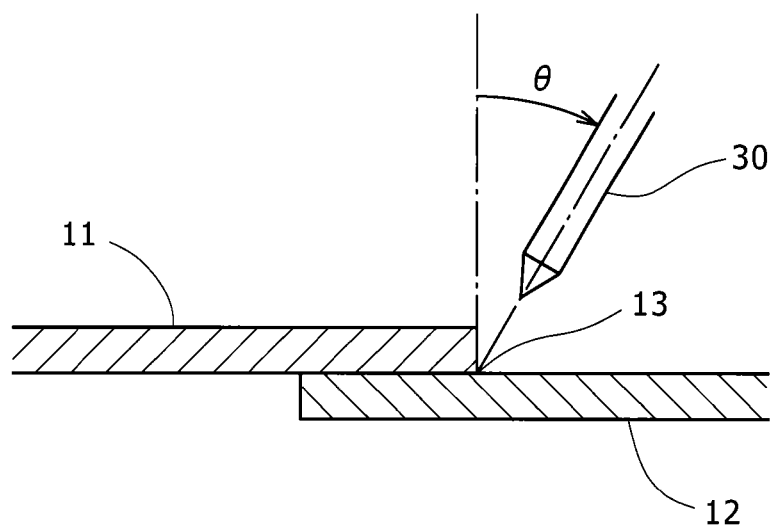
FIG. 12 is a vertical cross-sectional view showing a state welding is executed aiming a lap section of the aluminum alloy material and the steel material in a state the tungsten electrode is tilted to the steel material side in an improvement test.

As shown in FIG. 12, the lap fillet welding executing welding by overlaying two metal sheets each other and tilting the torch (the electrode 30) while targeting the step section 13 formed by the end 11a of the upper metal sheet 11 and the surface of the lower metal sheet 12 is a method generally executed in welding of metal sheets of a same kind to each other such as steel materials to each other, aluminum alloy materials to each other and the like. With respect to the inclination angle θ of the torch (the electrode 30) then, a range with which the weld penetration to the upper metal sheet 11 and the lower metal sheet 12 becomes appropriate is properly selected. For example, in bonding of the metal sheets 11, 12 constituting a transportation vehicle to begin with an automobile, fillet welding of 1 pass is executed, however, when the inclination angle θ of the torch (the electrode 30) becomes excessively large, the weld penetration to the lower metal sheet 12 becomes less. For example, in lap fillet welding of the aluminum alloy materials to each other, the inclination angle θ of the torch (the electrode) is 5°-15°.

On the other hand, in dissimilar metals bonding of fillet welding of the aluminum alloy material 11 and the steel material 12 by TIG welding using the tungsten electrode 30, such a welding condition is necessary in which, while securing melting of the aluminum alloy material 11 and the FCW 7 that is the welding material, the surface of the steel material 12 is also heated properly, and the condition is inevitably different from that of welding of the metal sheets of a same kind to each other such as steel materials to each other, aluminum alloy materials to each other, and the like.

It is considered that, in dissimilar metals bonding of lap fillet welding of the aluminum alloy material 11 and the steel material 12 thus, the inclination angle of the tungsten electrode 30, the target position in irradiating the arc 3 from the tungsten electrode 30 (the position where the extension line of the axis of the tungsten electrode 30 crosses the surface of the aluminum alloy material 11) for executing proper lap fillet welding are different from those of welding of metal sheets of a same kind to each other.

Therefore, the present inventors executed welding tests variously changing the inclination angle of the tungsten electrode 30 in TIG welding and the target position in irradiating the arc 3 from the tungsten electrode 30, and made a lot of intensive researches. As a result, the present inventors found out a proper welding condition capable of forming the excellent bead 4.

(Inclination of Tungsten Electrode)

When the tungsten electrode 30 is tilted directed to the steel material 12 side from the direction orthogonal to the steel material 12, the arc 3 irradiated from the tungsten electrode 30 is relatively directed to the aluminum alloy material 11 side. Thus, an action pushing the molten metal of the FCW 7 to the aluminum alloy material 11 side is generated. As a result, the molten metal of the aluminum alloy material 11 and the molten metal of the FCW 7 are integrated, and the effect of preventing separation of the bead can be secured. The effect starts to appear gradually when the inclination of the tungsten electrode 30 becomes 30° or more. Further, because the FCW 7 melts quickly, the wettability improvement effect of the flux is also exhibited easily. It is considered that the effect is exhibited when the inclination of the tungsten electrode 30 becomes 35° or more, and the bonding strength is also easily secured.

The effect of preventing separation of the bead and the wettability improvement effect described above are exhibited by directing the arc 3 irradiated from the tungsten electrode 30 to the aluminum alloy material 11 side as much as possible. Also, the effect is exhibited more significantly when the inclination angle of the tungsten electrode 30 is made as large as possible. However, when the inclination angle of the tungsten electrode 30 is made excessively large, the tungsten electrode 30 contacts the surface of the steel material 12, and therefore there is a limit in the magnitude of the inclination angle. Considering such point, the tungsten electrode 30 is made a state tilted by 35° or more and less than 60° toward the steel material 12 side from the direction orthogonal to the steel material 12) (35°≤θ<60°).

(Target Position of Arc from Tungsten Electrode)

When the target position in irradiating the arc 3 from the tungsten electrode 30 is made the step section 13 formed by the end 11a of the aluminum alloy material 11 and the surface of the steel material 12 as is generally executed in welding of metal sheets of a same kind to each other, the heat input to the steel material 12 increases excessively. In this case, the steel material 12 is molten. Also, in this case, even if the steel material 12 does not reach to be molten, a thick intermetallic compound is formed. Because of these reasons, even when a continuous bead can be formed, a crack may be generated and sufficient joint strength cannot be secured. Also, the "target position" means the position where the extension line of the axis of the tungsten electrode 30 crosses the surface of the aluminum alloy material 11.

The present inventors found out that it was effective to make the target position in irradiating the arc 3 from the tungsten electrode 30 not the step section 13 as generally executed in welding of metal sheets of a same kind to each other but more on the aluminum alloy material 11 side, that is the surface of the aluminum alloy material 11. More specifically, the target position in irradiating the arc 3 from the tungsten electrode 30 is made the position in the range of 1.0 mm or more and less than 3.0 mm to the aluminum alloy material 11 side from the end 11a of the aluminum alloy material 11 (1.0 mm≤x<3.0 mm). Also, "the aluminum alloy material 11 side" means the position closer to the center of the aluminum alloy material 11 from the start point of the end 11a of the aluminum alloy material 11.

(Arrangement of Tip Section of Tungsten Electrode)

The tip section of the tungsten electrode 30 should be arranged at the position vertically departing from the surface of the aluminum alloy material 11 (on the perpendicular line orthogonal to the surface of the aluminum alloy material 11), and should be arranged at least at the position departing vertically by 2.0 mm or more and less than 4.5 mm (2.0 mm≤z<4.5 mm). Further, this position is affected also by the sheet thickness of the aluminum alloy material 11, the inclination angle of the tungsten electrode 30, the target position of the arc 3 from the tungsten electrode 30, and the welding conditions (the current and voltage, welding speed, FCW feeding speed).

(Power Source)

First, the power source is changed from an AC power source generally used in welding of the aluminum alloy material 11 to a DC power source. That is, TIG welding is executed by DC TIG welding. By DC TIG welding, the melting range of the aluminum alloy material 11 can be reduced.

(Other Conditions)

Although the conditions described above are indispensable conditions for each of the first-third aspects of the invention, it is preferable that the FCW 7 is fed from the welding proceeding direction. Also, for the tungsten electrode 30, an angle of advance a of within approximately 15° may be arranged. When the FCW 7 is fed from the welding proceeding direction, the FCW 7 starts to melt on the front side of the molten pool of the aluminum alloy material 11, therefore melt mixing of the both is easy, and the excellent bead 4 can be formed. When the FCW 7 is fed from opposite the proceeding direction, the FCW 7 melts on the back side of the molten pool of the aluminum alloy material 11. Therefore, melt mixing of the both becomes hard, and formation of the excellent bead 4 becomes hard.

Also, in the dissimilar metals bonding method of the present invention, the aluminum alloy material 11, the steel material 12, and the flux-cored wire (FCW) 7 are not particularly limited. However, as the material of them, use of the materials described below is recommendable.

[Aluminum Alloy Material]

As the aluminum alloy material 11 that is the material to be welded, according to the required properties of the applied vehicular body structure and the like such as the strength and formability, or the corrosion resistance and the like, an aluminum alloy such as 3000 series, 5000 series, 6000 series, 7000 series and the like stipulated in the JIS or the AA standards can be used. However, from the viewpoint of thinning of the aluminum alloy material 11 against the requirement of vehicular body weight reduction of an automobile and the like, it is preferable to use an aluminum alloy particularly with high strength and excellent in formability also among these aluminum alloys.

Also, it is particularly preferable to use an Si-excess type 6000 series aluminum alloy such as 6N01, 6016, 6111, 6022 and the like with 1 or more mass ratio of Si and Mg (Si/Mg) in the component composition and excessively containing Si with respect to the Mg content. The joint after welding using the aluminum alloy material 11 formed of these 6000 series aluminum alloy also has the feature that the strength and elongation once deteriorated by the welding heat effect can be restored by subjecting to artificial aging treatment of a very short time of approximately 10-50 min at very low temperature of 160-180° C.

These aluminum alloy materials 11 are subjected to solution heat treatment and quenching treatment (quality symbol: T4), aging treatment thereafter (quality symbol: T6), and overaging treatment (quality symbol: T7) after cold rolling and hot extruding, and are used as the welding parent material. In the meantime, the aluminum alloy material 11 is not necessarily to be a sheet-like cold rolled sheet in its entirety, and at least the overlapping section with the steel material 12 only has to be sheet-like. Further, various shapes of extruded shapes can also be used, and members and components for a vehicular body formed into a predetermined shape may also be used. The thickness of the sheet-like portion of the aluminum alloy material 11 is preferable to be 1-3 mm. When the thickness of the aluminum alloy material 11 is excessively thin, the required strength and rigidity as an automobile member cannot be secured. On the other hand, when the thickness of the aluminum alloy material 11 is excessively thick, execution of welding becomes hard.

(Steel Material)

As the steel material 12 that is the material to be welded, various steel sheets such as the cold rolled sheets and steel shapes of mild steel, high tensile strength steel, stainless steel can be used. Also, the steel material 12 may be a member, component and the like for a vehicular body obtained by molding these raw materials into a predetermined shape. Further, from the viewpoint of thinning the steel material 12 against the requirement of weight reduction of a vehicular body of an automobile and the like, it is preferable to use high tensile strength steel such as a high tensile strength steel sheet having a publicly known component composition containing Si, Mn and the like and the tensile strength of 450 MPa or more.

Also, in assuming to the use as an automobile member, it is preferable that the thickness of the welded portion of the steel material 12 such as a cold rolled steel sheet and the like is 0.3-3.0 mm. Similarly to the case of the aluminum alloy material 11, when the thickness of the steel material 12 is excessively thin, the required strength and rigidity as an automobile member cannot be secured, whereas when the thickness of the steel material 12 is excessively thick, execution of welding becomes hard.

Also, for the sake of the welding efficiency and for the sake of excellent bead formation, it is preferable that a zinc-based and aluminum-based coated layer is formed on the surface of the steel material 12, however, the steel material 12 without coating is also acceptable. The coating layer can be formed by means of hot dipping or thermal spraying and the like.

(Flux-Cored Wire)

As the flux-cored wire (FCW) 7, those commercially available from the past for dissimilar metals bonding of the aluminum alloy material 11 and the steel material 12 and the like can be used. Such FCW 7 is a widely known one developed for improving the efficiency of melt welding in which flux is filled as a core material in a tubular outer sheath (may also be referred to as a hoop) made of a standardized aluminum alloy such as A4047, A4043 and the like containing Si for example.

The wire diameter of this FCW 7 is preferable to be a small diameter of approximately 0.8-1.6 mmΦ similar to that of one commercially available for high efficiency automatic welding or for semi-automatic welding. Also, with respect to the flux, it is preferable to use flux having a composition of a fluorine compound system called "Nocolok" for bonding dissimilar materials of the aluminum alloy material 11 and the steel material 12 to each other. This flux is widely known flux obtained by properly mixing an oxide (aluminum oxide and the like) and aluminum alloy powder in addition to a fluorine compound.

EXAMPLES

Below, the present invention will be described more specifically referring to examples. The present invention is not limited by the examples below, it is a matter of course that the present invention can be also implemented with modifications being added appropriately within the scope adaptable to the purposes described above and below, and any of them is to be included within the technical range of the present invention.

[First Aspect of Invention]

An example of the first aspect of the invention will be described below. In the form of the welding operation of FIG. 9, the shape of the tip section and the direction relative to the aluminum alloy material 11 side (arrangement, positional relation) of the tungsten electrode were changed variously as shown in FIG. 4-FIG. 8. Also, by overlaying the end of the aluminum alloy sheet on top of the end of the steel sheet and executing TIG welding, various dissimilar materials welding bonding joints were manufactured. Table 1 shows the result of evaluation of the bead appearance and the tensile shear strength (bonding strength) of the joint respectively.

The tungsten electrode 1 (FIGS. 1(a) and 1(b)) used in the present invention example was manufactured by working the tip of the commercially available tungsten electrode with 3.2 mmΦ diameter. The tip surface 2 is shaped by being diagonally cut with 30° of the tip angle θ relative to the electrode axis 6. The length of the tip surface 2 from the tip 2a in the direction of the electrode axis 6 is 5.6 mm. The conventional tungsten electrode 30 of FIG. 2 is a commercially available tungsten electrode with 3.2 mmΦ diameter, and the tip section 31 is of a symmetric conical circular shape having the tip angle of 15° relative to the electrode axis 32. The length from the tip 31a in the direction of the electrode axis 32 is 6.0 mm. The tungsten electrode 20 (FIGS. 3(a) and 3(b)) of the comparative example was manufactured by working the commercially available tungsten electrode with 3.2 mmΦ diameter. The tungsten electrode 20 of the comparative example has a symmetric tip section shape, and the tip angle relative to the axis 22 of the tip section 21 is 15°. The length from the tip 21a of the tungsten electrode 20 in the direction of the electrode axis 22 is 6.0 mm.

In these examples, common welding operation conditions are as described below.

As the flux-cored wire (FCW) 7, a commercially available FCW is used which contains K—Al—F system (Nocolok flux) of 5 mass % as the powder flux, has the sheath material (hoop) of an aluminum alloy added with Si of 1.25 mass %, and has the wire diameter of Φ1.2 mm.

The welding condition is by DC TIG welding, the current is 80-120 A, the welding speed is 30-40 cm/min, the filler feeding speed is 6-9 m/min, and the shield gas is Ar of 20 L/min. Also, the position of the tungsten electrode 1 (the tip 2a) is right above the end 11a of the aluminum alloy material 11, and the height of the electrode 1 (the tip 2a) is 1.6 mm above the surface of the aluminum alloy material 11. The angle of advance a of the electrode 1 is 10°, and welding was executed so that the bead length became 200 mm.

As the aluminum alloy material 11, a 6000 series (6022) aluminum alloy cold rolled sheet with 1.2 mm or 2.0 mm thickness is used. As the steel material 12, a GA high strength steel sheet that is a 980 MPa class with 1.4 mm thickness is used.

[Bead Appearance]

In evaluation of the appearance of the bead 4, passing (◎) is a state with excellent wettability in which the bead 4 is formed excellently so as to continue over both of the welding surface of the steel material 12 and the welding surface of the aluminum alloy material 11 as shown in FIG. 9. Also, a state the size of the bead on the welding surface side of the steel material 12 is comparative small in comparison to the above however the bead 4 continues and the wettability is proper is ○, and a state the bead 4 continues however the size of the bead on the welding surface side of the steel material 12 is excessively small and the wettability is inferior is Δ.

Further, a state the bead 4 is intermittent and separation of the bead as shown in FIG. 10 occurs is ×.

(Tensile Shear Strength (Tensile Strength) of Joint)

The tensile shear strength is measured by cutting out two each of the strip-like specimens with 20 mm sheet width from the dissimilar materials lap fillet joint after TIG welding and executing the tensile test. From the average value of two tensile shear strengths obtained as the result, the joint efficiency that is a rate relative to the tensile strength of the A6022 aluminum alloy cold rolled sheet that is the parent material is calculated. By comparing this joint efficiency with the joint efficiency of the TIG welding lap fillet joint of the A6022 aluminum alloy sheets to each other manufactured under the welding condition same to that of the present example (the rate relative to the tensile strength of the A6022 aluminum alloy cold rolled sheet that is the parent material of the joint of the aluminum to each other), the tensile shear strength is evaluated. The joint efficiency per unit welding line of the welding joint of the 6022 aluminum alloy sheets to each other is 60% or more. Therefore, the joint efficiency of the dissimilar materials lap fillet joint obtained by TIG welding is evaluated to be ○ for 60% or more, Δ for 40% to less than 60%, and × for less than 40%.

TABLE 1

| Classification | Aluminum alloy material (sheet thickness) | Steel material (sheet thickness) | Electrode shape (corresponding drawing) | Electrode arrangement (corresponding drawing) | Bead appearance | Tensile shear strength | Comprehensive evaluation |
|---|---|---|---|---|---|---|---|
| Comparative example 1 | 6022 (1.2 mm) | GA980 (1.4 mm) | Conventional (FIG. 2) | Conventional (FIG. 7) | X | X | X |
| Invention example 1 | 6022 (1.2 mm) | GA980 (1.4 mm) | Present invention (FIG. 1) | Present invention (FIG. 4) | ◎ | ○ | ○ |
| Comparative example 2 | 6022 (1.2 mm) | GA980 (1.4 mm) | Present invention (FIG. 1) | Comparative example (FIG. 5) | Δ | Δ | Δ |
| Comparative example 3 | 6022 (1.2 mm) | GA980 (1.4 mm) | Present invention (FIG. 1) | Comparative example (FIG. 6) | X | X | X |
| Comparative example 4 | 6022 (2.0 mm) | GA980 (1.4 mm) | Conventional (FIG. 2) | Conventional (FIG. 7) | X | X | X |
| Invention example 2 | 6022 (2.0 mm) | GA980 (1.4 mm) | Present invention (FIG. 1) | Present invention (FIG. 4) | ○ | ○ | ○ |
| Comparative example 5 | 6022 (2.0 mm) | GA980 (1.4 mm) | Comparative example (FIG. 3) | Comparative example (FIG. 8) | X | X | X |

As is clear from Table 1, in the invention examples 1, 2, even by TIG welding under an efficient operation condition, the dissimilar metals bonding joint with excellent bead appearance and high bonding strength has been obtained. More specifically, in the invention examples 1, 2, suppression of separation of the bead and the reaction layer (interface reaction layer) of steel and aluminum in the interface, secureness of weld penetration of aluminum and the like which are hard to be achieved simultaneously by TIG welding under an efficient operation condition have been able to be achieved simultaneously.

On the other hand, in the comparative examples 1-5 of Table 1, as shown in Table 1 also, the electrode shape and arrangement have deviated from the condition of the present invention. Therefore, as a whole, by TIG welding under the efficient operation condition, suppression of separation of the bead and the reaction layer of steel and aluminum in the interface, secureness of weld penetration of aluminum and the like have not been achieved simultaneously, and high bonding strength has not been able to be secured. Among them, particularly, the cause of that the comparative examples 2, 3 using the electrode shape of FIGS. 1(a) and 1(b) of the present invention (the electrode 1) have not been able to secure high bonding strength is that the diagonally cut tip section (tip surface) 2 of the electrode 1 is not directed to the aluminum alloy material 11 side. Therefore, in the comparative examples 2, 3, the direction of the arc 3 becomes such the direction as that in FIGS. 5, 6, and the arc 3 from the tip 2a of the tungsten electrode 1 is not directed to the steel material 12 side.

Accordingly, from the result of these examples, the importance of respective requirements stipulated in the first aspect of the invention is endorsed.

[Second Aspect of Invention]

An example of the second aspect of the invention will be described below. In the example of the second aspect of the invention, the welding test is executed in a constitution similar to that of FIG. 9. More specifically, first, one end of the aluminum alloy material 11 is overlaid on top of one end of the steel material 12. Then, TIG welding is executed using the bar-like tungsten electrode 30 while feeding the flux-cored wire (FCW) 7 to the step section 13 formed by the end 11a of the aluminum alloy material 11 and the surface of the steel material 12 with the aluminum alloy material 11 side being made the positive pole.

As the aluminum alloy material 11, a 6000 series (6022) aluminum alloy cold rolled sheet with 1.2 mm or 2.0 mm thickness is used. As the steel material 12, a 1,470 MPa class cold rolled sheet with 1.4 mm thickness, a 980 MPa class cold rolled sheet with 1.4 mm thickness, or a 980 MPa class GA steel sheet with 1.2 mm thickness is used.

Also, the flux-cored wire (FCW) 7 contains Cs-based flux by 10 mass %, and has a sheath material of an aluminum alloy added with Si of 1.25 mass %. The wire diameter of the FCW 7 is Φ1.2 mm.

Welding is executed by DC TIG welding. With respect to the welding condition, the current is 80-120 A, the welding speed is 30 cm/min, the filler feeding speed is 6-10 m/min, the shield gas is Ar gas, and the shield gas feeding rate is 20 L/min. Also, the angle of advance a of the electrode 30 is 10°-15°, and welding is executed so that the length of the bead 4 becomes 200 mm.

The test result is evaluated by the appearance of the bead 4 formed and the tensile shear strength (bonding strength).

With respect to the appearance of the bead 4, one in which the bead 4 is formed excellently so as to continue over both of the welding surface of the aluminum alloy material 11 and the welding surface of the steel material 12 and the wettability can be determined to be excellent is shown by "◯" and is evaluated to have passed. One in which the bead 4 is formed continuously however the wettability can be determined to be inferior is shown by "Δ", one in which separation of the bead apparently occurs is shown by "×" respectively, and they are evaluated to have failed.

Also, the tensile shear strength is measured by cutting out two each of the strip-like specimens with 20 mm sheet width including the welding section from the dissimilar metals bonding joint after TIG welding and executing the tensile test. From the average value of two tensile shear strengths obtained as the result, the joint efficiency that is a rate relative to the tensile strength of the 6000 series (6022) aluminum alloy cold rolled sheet that is the parent material can be calculated. By comparing this joint efficiency with the joint efficiency of the lap fillet welding joint of the 6000 series (6022) aluminum alloy cold rolled sheets to each other manufactured by TIG welding using a generalized welding wire for aluminum alloy, the tensile shear strength (bonding strength) is evaluated.

The joint efficiency per unit welding line of the lap fillet welding joint of the 6000 series (6022) aluminum alloy cold rolled sheets to each other is 60% or more. Therefore, one with 60% or more of the joint efficiency of the dissimilar materials lap fillet welding joint obtained by TIG welding that is at least a same level with the case of the aluminum alloy cold rolled sheets to each other is shown by "◯" and is evaluated to have passed. One with the joint efficiency of 40% to less than 60% is shown by "Δ", one with less than 40% is shown by "×", and they are evaluated to have failed respectively. Table 2 shows the test result of the above.

TABLE 2

| Classification | Aluminum alloy material (sheet thickness) | Steel material (sheet thickness) | Electrode angle θ (deg) | Horizontal position x (mm) | Height z (mm) | Bead appearance | Tensile shear strength |
|---|---|---|---|---|---|---|---|
| Comparative example 11 | 6022 | 1,470 MPa cold rolled | 0 | 0.0 | 3.2 | X | X |
| Comparative example 12 | (1.2 mm) | (1.4 mm) | 0 | 3.0 | 4.0 | X | X |
| Comparative example 13 | | | 5 | 2.0 | 3.2 | Δ | X |
| Invention example 11 | | | 10 | 2.0 | 3.2 | ◯ | ◯ |
| Invention example 12 | | | 10 | 2.0 | 4.0 | ◯ | ◯ |
| Comparative example 14 | | | 20 | 1.0 | 1.6 | Δ | X |
| Invention example 13 | | | 20 | 1.0 | 2.0 | ◯ | ◯ |
| Invention example 14 | | | 20 | 3.0 | 4.0 | ◯ | ◯ |
| Comparative example 15 | | | 20 | 3.0 | 4.5 | ◯ | Δ |
| Comparative example 16 | | | 20 | 3.5 | 4.0 | ◯ | Δ |
| Invention example 15 | | | 25 | 0.0 | 3.2 | ◯ | ◯ |

TABLE 2-continued

| Classification | Aluminum alloy material (sheet thickness) | Steel material (sheet thickness) | Electrode angle θ (deg) | Horizontal position x (mm) | Height z (mm) | Bead appearance | Tensile shear strength |
|---|---|---|---|---|---|---|---|
| Invention example 16 | | | 25 | 1.0 | 3.2 | ○ | ○ |
| Invention example 17 | | | 30 | 1.0 | 3.2 | ○ | ○ |
| Comparative example 17 | | | 35 | 1.0 | 3.2 | Δ | X |
| Invention example 18 | | 980 MPa cold rolled (1.4 mm) | 20 | 3.0 | 4.5 | ○ | ○ |
| Invention example 19 | | 980 MPaGA (1.2 mm) | 20 | 1.0 | 2.5 | ○ | ○ |
| Comparative example 18 | 6022 | 1,470 MPa cold rolled (1.4 mm) | 0 | 0.0 | 3.2 | X | X |
| Comparative example 19 | (2.0 mm) | | 0 | 1.0 | 3.2 | X | X |
| Invention example 20 | | | 15 | 1.0 | 3.2 | ○ | ○ |
| Invention example 21 | | | 25 | 0.0 | 3.2 | ○ | ○ |
| Invention example 22 | | | 25 | 1.0 | 3.2 | ○ | ○ |
| Invention example 23 | | 980 MPaGA (1.2 mm) | 25 | 1.0 | 3.2 | ○ | ○ |

The inclination angle (electrode angle) θ of the tungsten electrode toward the aluminum alloy material side is over 5° and less than 35° (5°<θ<35°). The horizontal position of the tip section of the tungsten electrode is within a range closer to the inner side by 0 mm or more and less than 3.5 mm from the end 11a of the aluminum alloy material (0 mm≤x<3.5 mm). The height of the tip section of the tungsten electrode is at the position departing upward by 2.0 mm or more and less than 4.5 mm from the surface position of the aluminum alloy material (2.0 mm≤z<4.5 mm). In the invention examples 11-23 satisfying all of these requirements, both of the appearance of the bead and the tensile shear strength are "○", and excellent appearance and bonding strength have been secured. That is, prevention of occurrence of separation of the bead, suppression of formation of the intermetallic compound layer (or the reaction layer) in the interface, secureness of weld penetration of the aluminum alloy and the like which are hardly achieved simultaneously have been able to be achieved simultaneously in TIG welding.

On the other hand, the comparative examples 11-13, 17-19 do not satisfy the requirement on the inclination angle θ of the tungsten electrode toward the aluminum alloy material side. Also, the comparative example 16 does not satisfy the requirement on the horizontal position of the tip section of the tungsten electrode, and the comparative examples 14, 15 do not satisfy the requirement on the height of the tip section of the tungsten electrode. Therefore, these comparative examples resulted to have failed because at least either of the appearance of the bead and the tensile shear strength was "Δ" or "×".

[Third Aspect of Invention]

An example of the third aspect of the invention will be described below. In the example of the third aspect of the invention, the welding test is executed in a constitution similar to that of FIG. 9. More specifically, first, one end of the aluminum alloy material 11 is overlaid on top of one end of the steel material 12. Then, TIG welding is executed using the bar-like tungsten electrode 30 while feeding the flux-cored wire (FCW) 7 to the step section 13 formed by the end 11a of the aluminum alloy material 11 and the surface of the steel material 12 with the aluminum alloy material 11 side being made the positive pole.

As the aluminum alloy material 11, a 6000 series (6022) aluminum alloy cold rolled sheet with 1.2 mm or 2.0 mm thickness is used. As the steel material 12, a 980 MPa class cold rolled sheet with 1.4 mm thickness, a 1,470 MPa class cold rolled sheet with 1.4 mm thickness, or a 980 MPa class GA steel sheet with 1.4 mm thickness is used.

Also, the flux-cored wire (FCW) 7 contains Cs-based flux by 10 mass %, and has a sheath material of an aluminum alloy added with Si of 1.25 mass %. The wire diameter of the FCW 7 is Φ1.2 mm.

Welding is executed by DC TIG welding. With respect to the welding condition, the current is 80-120 A, the welding speed is 30 cm/min, the filler feeding speed is 6-10 m/min, the shield gas is Ar gas, and the shield gas feeding rate is 20 L/min. Also, the angle of advance a of the electrode 30 is 5°-15°, and welding is executed so that the length of the bead 4 becomes 200 mm.

The test result is evaluated by the appearance of the bead 4 formed and the tensile shear strength (bonding strength).

With respect to the appearance of the bead 4, one in which the bead 4 is formed excellently so as to continue over both of the welding surface of the aluminum alloy material 11 and the welding surface of the steel material 12 and the wettability can be determined to be excellent is shown by "○" and is evaluated to have passed. One in which the bead 4 is formed continuously however the wettability can be determined to be inferior is shown by "Δ", one in which separation of the bead apparently occurs is shown by "×" respectively, and they are evaluated to have failed.

Also, the tensile shear strength is measured by cutting out two each of the strip-like specimens with 20 mm sheet width including the welding section from the dissimilar metals bonding joint after TIG welding and executing the tensile test. From the average value of two tensile shear strengths obtained as the result, the joint efficiency that is a rate relative to the tensile strength of the 6000 series (6022) aluminum alloy cold rolled sheet that is the parent material can be calculated. By comparing this joint efficiency with the joint efficiency of the lap fillet welding joint of the 6000 series (6022) aluminum alloy cold rolled sheets to each other manufactured by TIG welding using a generalized welding wire for aluminum alloy, the tensile shear strength (bonding strength) is evaluated.

The joint efficiency per unit welding line of the lap fillet welding joint of the 6000 series (6022) aluminum alloy cold rolled sheets to each other is 60% or more. Therefore, one with 60% or more of the joint efficiency of the dissimilar materials lap fillet welding joint obtained by TIG welding that is at least a same level with the case of the aluminum alloy cold rolled sheets to each other is shown by "○" and is evaluated to have passed. One with the joint efficiency of 40% to less than 60% is shown by "Δ", one with less than 40% is shown by "×", and they are evaluated to have failed respectively. Table 3 shows the test result of the above.

TABLE 3

| Classification | Aluminum alloy material (sheet thickness) | Steel material (sheet thickness) | Electrode angle θ(deg) | Target position x (mm) | Height z (mm) | Bead appearance | Tensile shear strength |
|---|---|---|---|---|---|---|---|
| Comparative example 31 | 6022 (2.0 mm) | 980 MPa cold rolled (1.4 mm) | 0 | 0.0 | 3.2 | X | X |
| Comparative example 32 | | | 0 | 2.2 | 3.2 | X | X |
| Comparative example 33 | | | 20 | 0.0 | 1.6 | Δ | X |
| Comparative example 34 | | | 20 | 2.2 | 3.2 | Δ | Δ |
| Comparative example 35 | | | 30 | 2.2 | 3.2 | ○ | Δ |
| Comparative example 36 | | | 45 | 1.6 | 1.6 | Δ | X |
| Invention example 31 | | | 45 | 2.2 | 3.2 | ○ | ○ |
| Invention example 32 | | | 55 | 1.4 | 2.4 | ○ | ○ |
| Invention example 33 | | 1,470 MPa cold rolled (1.4 mm) | 45 | 2.4 | 2.4 | ○ | ○ |
| Invention example 34 | | | 45 | 2.2 | 3.2 | ○ | ○ |
| Invention example 35 | | | 45 | 2.0 | 4.0 | ○ | ○ |
| Invention example 36 | | | 55 | 1.4 | 2.4 | ○ | ○ |
| Comparative example 37 | | 980 MPaGA (1.4 mm) | 20 | 0.0 | 1.6 | Δ | X |
| Comparative example 38 | | | 30 | 2.2 | 3.2 | ○ | Δ |
| Invention example 37 | | | 45 | 2.2 | 3.2 | ○ | ○ |
| Invention example 38 | | | 55 | 1.4 | 2.4 | ○ | ○ |
| Comparative example 39 | 6022 (1.2 mm) | 980 MPa cold rolled (1.4 mm) | 0 | 0.0 | 3.2 | X | X |
| Comparative example 40 | | | 20 | 0.0 | 1.6 | Δ | X |
| Invention example 39 | | | 45 | 2.2 | 3.2 | ○ | ○ |
| Invention example 40 | | 1,470 MPa cold rolled (1.4 mm) | 45 | 2.2 | 3.2 | ○ | ○ |

The inclination angle (electrode angle) θ of the tungsten electrode toward the steel material side is made 35° or more and less than 60° (35°≤θ<60°). The target position of the arc from the tungsten electrode is arranged within a range closer to the inner side by 1.0 mm or more and less than 3.0 mm from the end 11a of the aluminum alloy material (1.0 mm≤x<3.0 mm). The tip section of of the tungsten electrode is arranged at the height position departing upward by 2.0 mm or more and less than 4.5 mm from the surface position of the aluminum alloy material (2.0 mm≤z<4.5 mm). In the invention examples 31-40 satisfying all of these requirements, both of the appearance of the bead and the tensile shear strength are "○", and excellent appearance and bonding strength have been secured. That is, prevention of occurrence of separation of the bead, suppression of formation of the intermetallic compound layer (or the reaction layer) in the interface, secureness of weld penetration of the aluminum alloy and the like have been able to be achieved simultaneously in TIG welding.

On the other hand, the comparative examples 31-35, 36-40 do not satisfy the requirement on the inclination angle (electrode angle) θ of the tungsten electrode toward the steel material side (35°≤θ<60°). Also, the comparative examples 31, 33, 37, 39, 40 do not satisfy the requirement on the target position x of the arc from the tungsten electrode (1.0 mm≤x<3.0 mm). Further, the comparative examples 33, 36, 37, 40 do not satisfy the requirement on the height z of the tip section of the tungsten electrode (2.0 mm≤z<4.5 mm). As a result, these comparative examples resulted to have failed because at least either of the appearance of the bead and the tensile shear strength was "Δ" or "×".

The embodiments and the examples of the present invention have been described as above, however, the present invention is not limited to the embodiments described above, and can be implemented while being variously changed within the description of the claims. The present application is based on the Japanese Patent Application No. 2011-049249 applied on Mar. 7, 2011, the Japanese Patent Application No. 2011-210459 applied on Sep. 27, 2011 and the Japanese Patent Application No. 2011-210460 applied on Sep. 27, 2011, and the contents thereof are hereby incorporated by reference.

INDUSTRIAL APPLICABILITY

According to the dissimilar metals bonding method of the present invention, a dissimilar materials welding joint (dissimilar metals bonding section) can be obtained which can prevent "separation of bead" and has high bonding strength when TIG welding is applied to dissimilar metals bonding of an aluminum alloy and a steel material. Accordingly, the dissimilar metals bonding method of the present invention can be usefully applied as the welding method of various dissimilar materials structural members in the transportation field such as automobiles, rolling stocks and the like, mechanical components, building structures and the like.

REFERENCE SIGNS LIST 1, 30 . . . tungsten electrode
2 . . . tip surface
2a . . . tip
3 . . . arc
4, 4a, 4b . . . bead
7 . . . flux-cored wire (FCW)
11 . . . aluminum alloy material
11a . . . end
12 . . . steel material
13 . . . step section

The invention claimed is:
1. A method for bonding dissimilar metals to each other, comprising:
 overlaying at least a part of an aluminum alloy material on a steel material; and
 fillet welding the aluminum alloy material and the steel material by direct current tungsten inert gas (DC TIG) welding using a tungsten electrode while feeding a flux-cored wire to a step section formed by an end of the aluminum alloy material and a surface of the steel material with an aluminum alloy material side being made a positive pole,
wherein
 the tungsten electrode comprises a tip of a shape asymmetric with respect to an axis of the tungsten electrode, the tip comprises a tip surface shaped at an angle of 20° or more and 40° or less relative to the axis, and during said fillet welding, an arc generated from the tip of the tungsten electrode is directed to a steel material side by directing the tungsten electrode to a welding line from an upper side of the aluminum alloy material so that the tip of the tungsten electrode is directed to the steel material side and that the tip surface is directed to the aluminum alloy material side.

2. The method according to claim 1, wherein the tip of the tungsten electrode locates right above the welding line of the aluminum alloy material.

3. The method according to claim 1, wherein the flux-cored wire is fed from a welding proceeding direction.

4. A method for bonding dissimilar metals to each other, comprising:

overlaying at least a part of an aluminum alloy material on a steel material; and fillet welding the aluminum alloy material and the steel material by direct current tungsten inert gas (DC TIG) welding using a tungsten electrode while feeding a flux-cored wire to a step section formed by an end of the aluminum alloy material and a surface of the steel material with an aluminum alloy material side being made a positive pole, wherein during said fillet welding, a tip section of the tungsten electrode is arranged at a position of a range of 0 mm or more and less than 3.5 mm from an end of the aluminum alloy material to the aluminum alloy material side in a direction parallel to the aluminum alloy material and a position vertically departing by 2.0 mm or more and less than 4.5 mm from a surface of the aluminum alloy material in a state where the tungsten electrode is tilted by an angle over 5° and less than 35° to the aluminum alloy material side from a direction orthogonal to the aluminum alloy material.

5. The method according to claim 4, wherein the flux-cored wire is fed from a welding proceeding direction.

6. A method for bonding dissimilar metals to each other, comprising:

overlaying at least a part of an aluminum alloy material on a steel material; and fillet welding the aluminum alloy material and the steel material by direct current tungsten inert gas (DC TIG) welding using a tungsten electrode while feeding a flux-cored wire to a step section formed by an end of the aluminum alloy material and a surface of the steel material with an aluminum alloy material side being made a positive pole, wherein during said fillet welding, a tip section of the tungsten electrode is arranged at a position vertically departing by 2.0 mm or more and less than 4.5 mm from a surface of the aluminum alloy material and a position where an extension line of an axis of the tungsten electrode crossing the surface of the aluminum alloy material is arranged in a range of 1.0 mm or more and less than 3.0 mm from an end of the aluminum alloy material to the aluminum alloy material side in a state where the tungsten electrode is tilted by 35° or more and less than 60° to a steel material side from the direction orthogonal to the steel material.

7. The method according to claim 6, wherein the flux-cored wire is fed from a welding proceeding direction.

* * * * *